US007674964B2

(12) United States Patent
Ohmura et al.

(10) Patent No.: US 7,674,964 B2
(45) Date of Patent: Mar. 9, 2010

(54) ELECTRONIC MUSICAL INSTRUMENT WITH VELOCITY INDICATOR

(75) Inventors: Hiroko Ohmura, Hamamatsu (JP); Daisuke Suzuki, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 11/391,728

(22) Filed: Mar. 28, 2006

(65) Prior Publication Data

US 2006/0219091 A1 Oct. 5, 2006

(30) Foreign Application Priority Data

Mar. 29, 2005 (JP) ............................. 2005-093711

(51) Int. Cl.
*A63J 17/00* (2006.01)
*G09B 15/00* (2006.01)
*G09B 15/02* (2006.01)
*G09B 15/08* (2006.01)
*G01P 3/00* (2006.01)
*G10H 1/02* (2006.01)

(52) U.S. Cl. ..................... 84/478; 84/464 A; 84/477 R; 84/626

(58) Field of Classification Search ............... 84/464 A, 84/464 R, 477 R, 478, 626, 658, 687
See application file for complete search history.

(56) References Cited

U.S. PATENT DOCUMENTS 5,247,864 A 9/1993 Konishi (Continued)

FOREIGN PATENT DOCUMENTS

JP 62-169394 U 10/1987

(Continued)

OTHER PUBLICATIONS

Office Action issued in corresponding Japanese Patent Application No. 2005-093711 dated Jun. 23, 2009.

(Continued)

*Primary Examiner*—Jeffrey Donels
*Assistant Examiner*—Andrew R Millikin
(74) *Attorney, Agent, or Firm*—Rossi, Kimms & McDowell LLP

(57) ABSTRACT

A keyboard electronic musical instrument is of a type which comprises a keyboard including a plurality of individual keys for playing individual musical notes and arrayed in a first direction, and a key detecting device for detecting respective key depression velocities of the individual keys. The instrument further comprises an indicator device which presents a plurality of bar-graphic indications respectively for the individual keys in the keyboard, the bar-graphic indications being arrayed side by side in the first direction, each bar-graphic indication being elongate in a second direction which is perpendicular to the first direction and representing the key depression velocity of each of the individual keys. When a key is depressed, the key depression velocity is detected and the bar-graphic indication which corresponds to the depressed key is illuminated in green color with a length representing the key depression velocity. When performance data containing velocity data of the respective note is given, the bar-graphic indication of the corresponding key of the note is illuminated in red color with a length representing the velocity of the note.

6 Claims, 12 Drawing Sheets

Configuration of Multilevel Indicator

U.S. PATENT DOCUMENTS

| | | | | | |
|---|---|---|---|---|---|
| 5,563,358 | A | * | 10/1996 | Zimmerman | 84/477 R |
| 5,886,273 | A | * | 3/1999 | Haruyama | 84/478 |
| 6,410,836 | B2 | | 6/2002 | Takahashi | |
| 6,515,210 | B2 | | 2/2003 | Shibukawa | |

FOREIGN PATENT DOCUMENTS

| | | | | |
|---|---|---|---|---|
| JP | 02-095098 | U | | 7/1990 |
| JP | 02-104374 | U | | 8/1990 |
| JP | 04063396 | A | * | 2/1992 |
| JP | 04-138500 | A | | 5/1992 |
| JP | 09297577 | A | * | 11/1997 |
| JP | 09-319363 | U | | 12/1997 |
| JP | 10-222160 | A | | 8/1998 |
| JP | 2000-194980 | A | | 7/2000 |
| JP | 2003-99056 | A | | 4/2003 |
| JP | 2004-170310 | A | | 6/2004 |

OTHER PUBLICATIONS

Notice of Refusal of the corresponding Japanese Patent Application No. JP2005-093711, dated Sep. 29, 2009. Partial Translation.

* cited by examiner

Hardware Configuration of Electronic Musical Instrument

*Fig. 2* Configuration of Multilevel Indicator
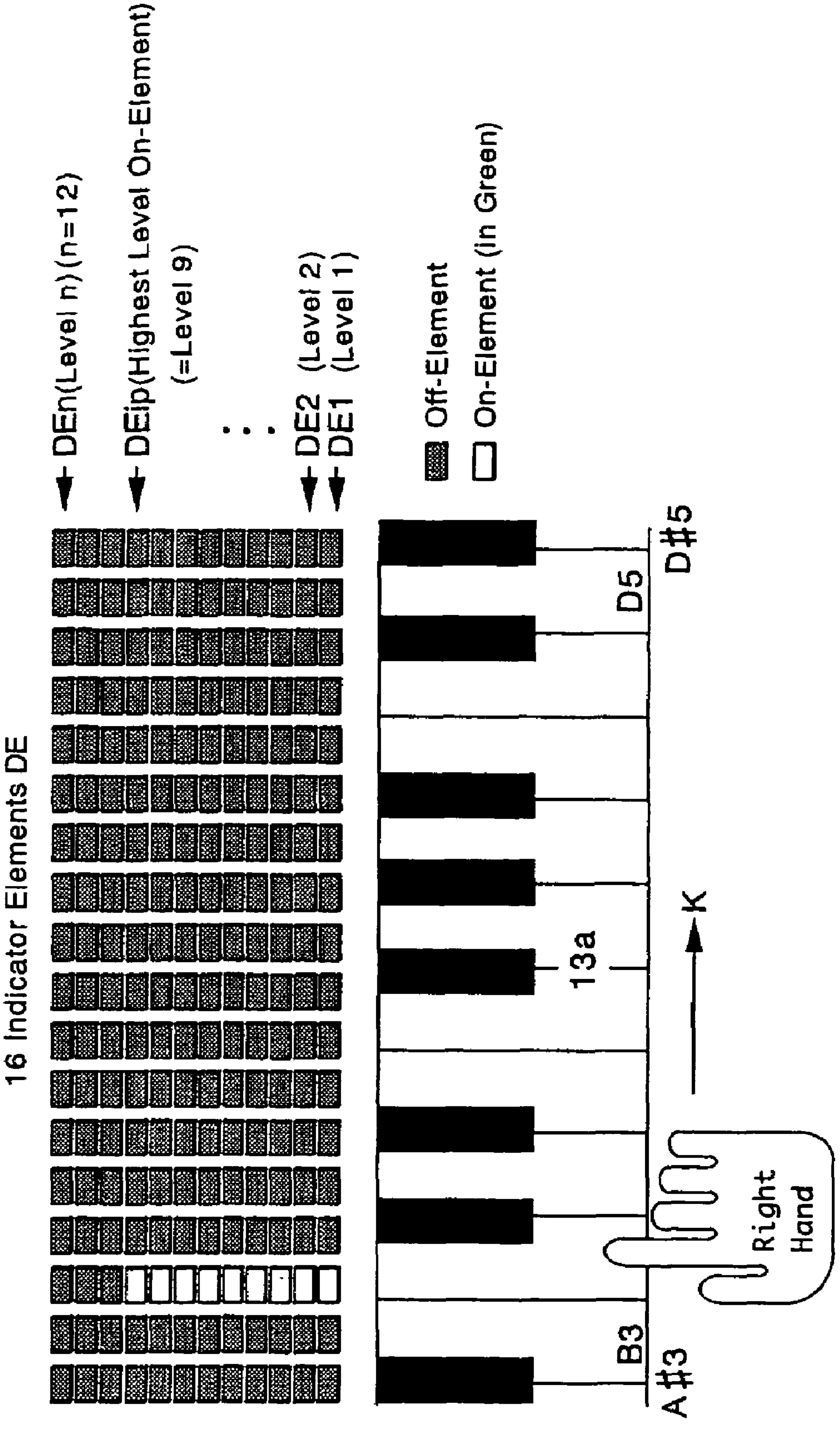

*Fig. 3a* Dual Indications of Manual and Automatic Performances
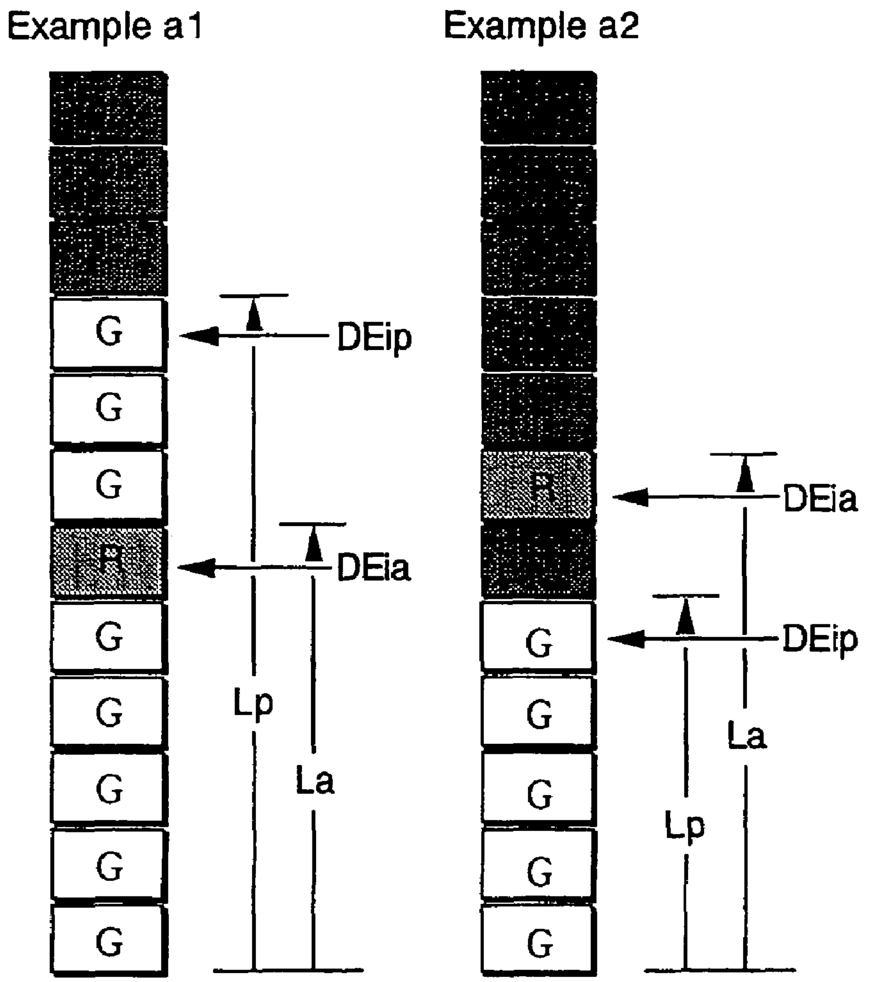
G, R: Element is On in Green or Red
Lp: Level of Manual Performance
La: Level of Automatic Performance

*Fig. 3b* Dual Indications of Manual and Automatic Performances
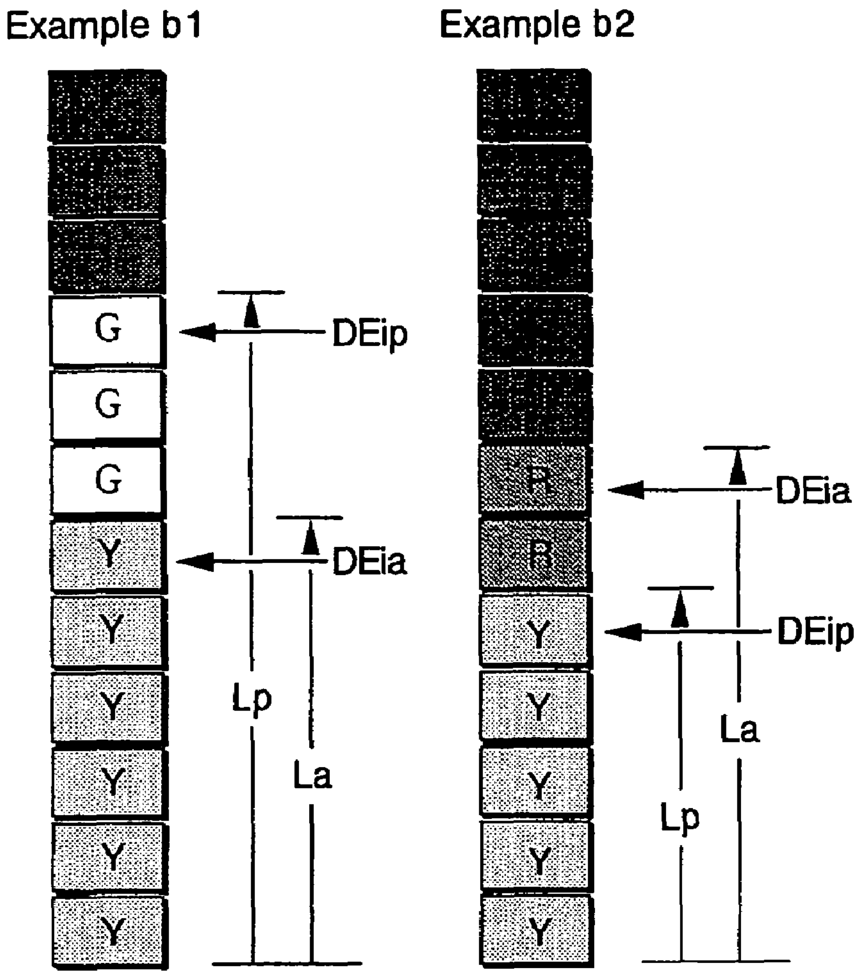
G, R, Y: Element is On in Green, Red or Yellow
Lp: Level of Manual Performance
La: Level of Automatic Performance

*Fig. 3c* Dual Indications of Manual and Automatic Performances
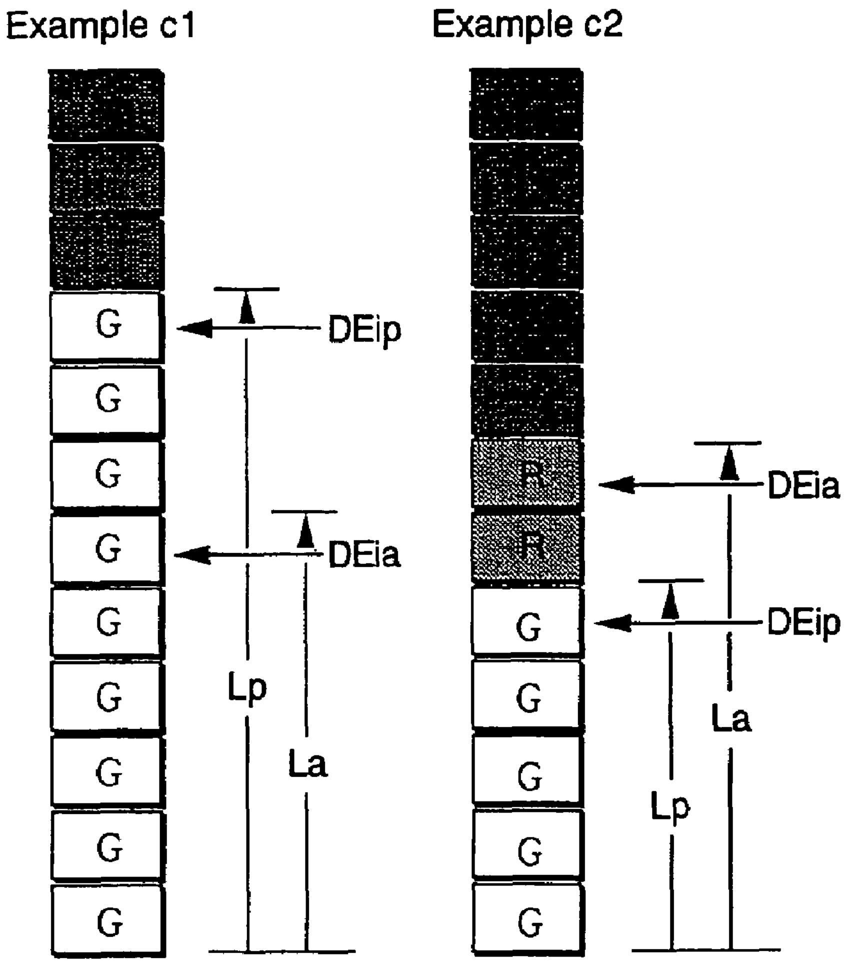
G, R: Element is On in Green or Red
Lp: Level of Manual Performance
La: Level of Automatic Performance

*Fig. 4* Structure of Automatic Performance Data
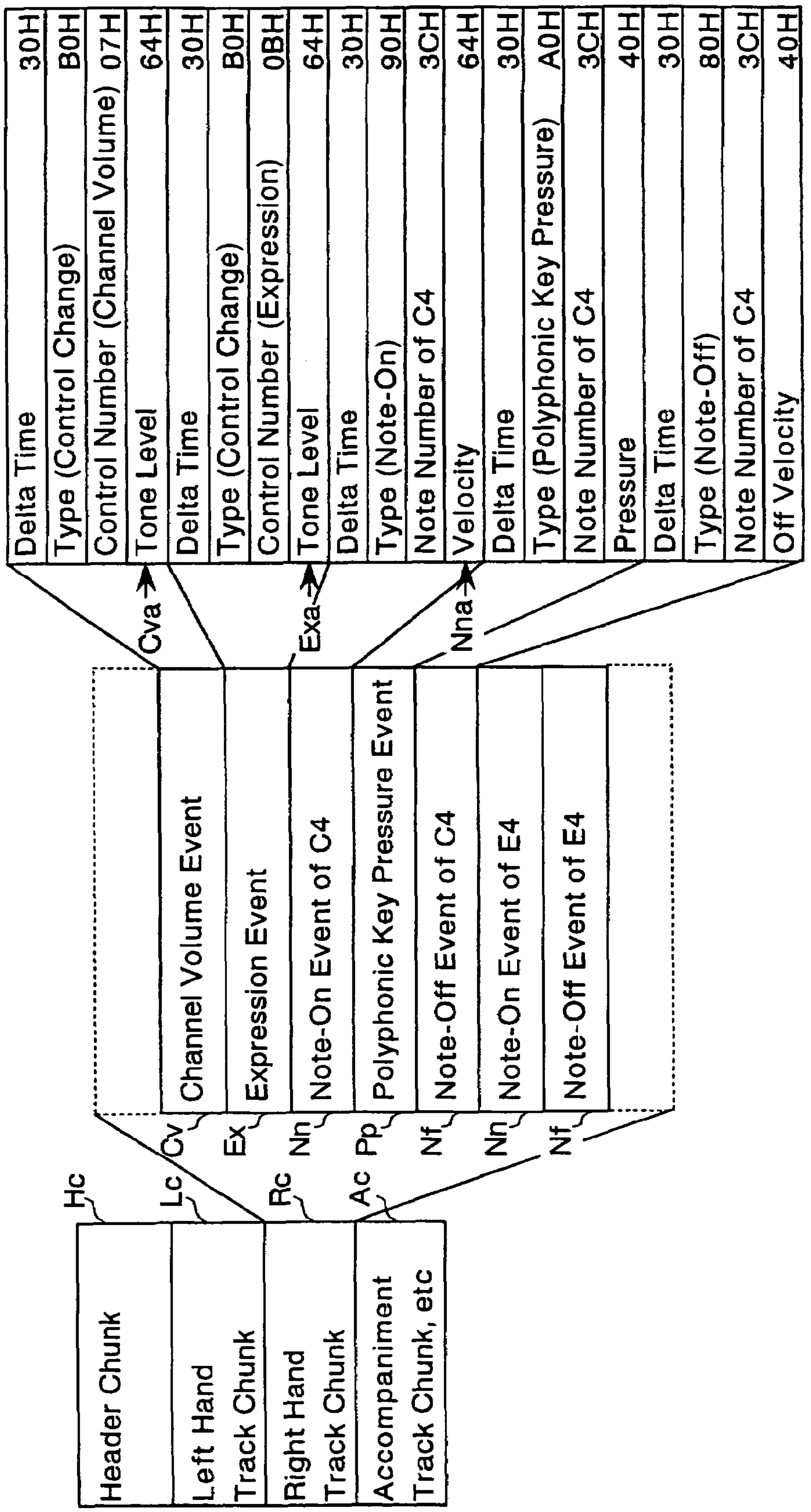

*Fig. 5* Processing for Starting Automatic Performance
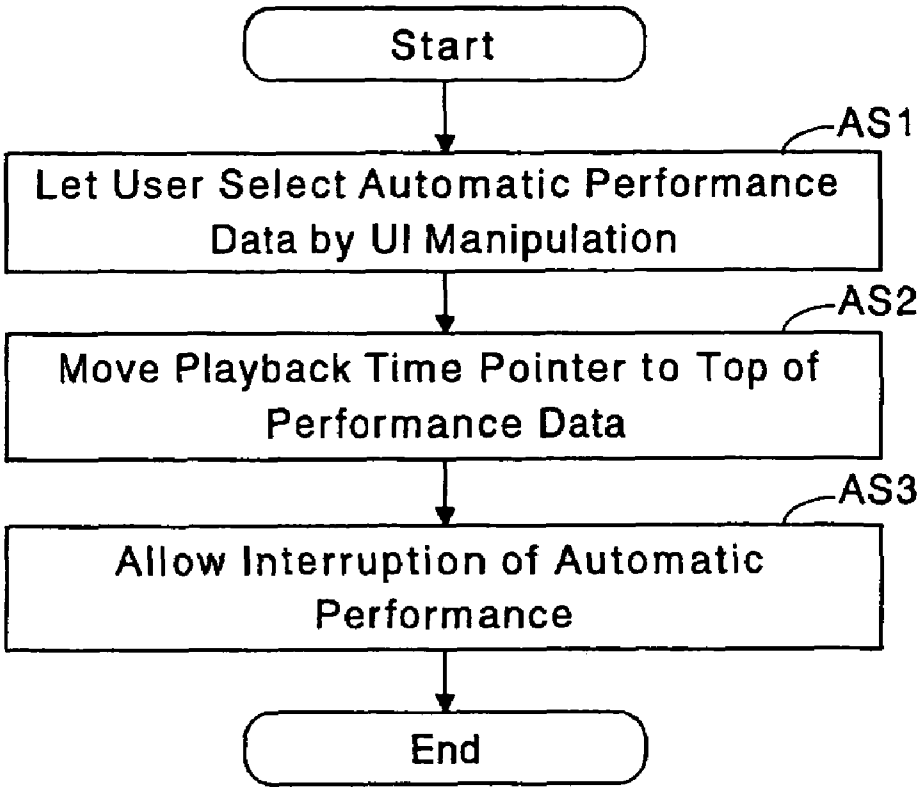

*Fig. 6a* Processing of Executing Automatic Performance (Part 1)
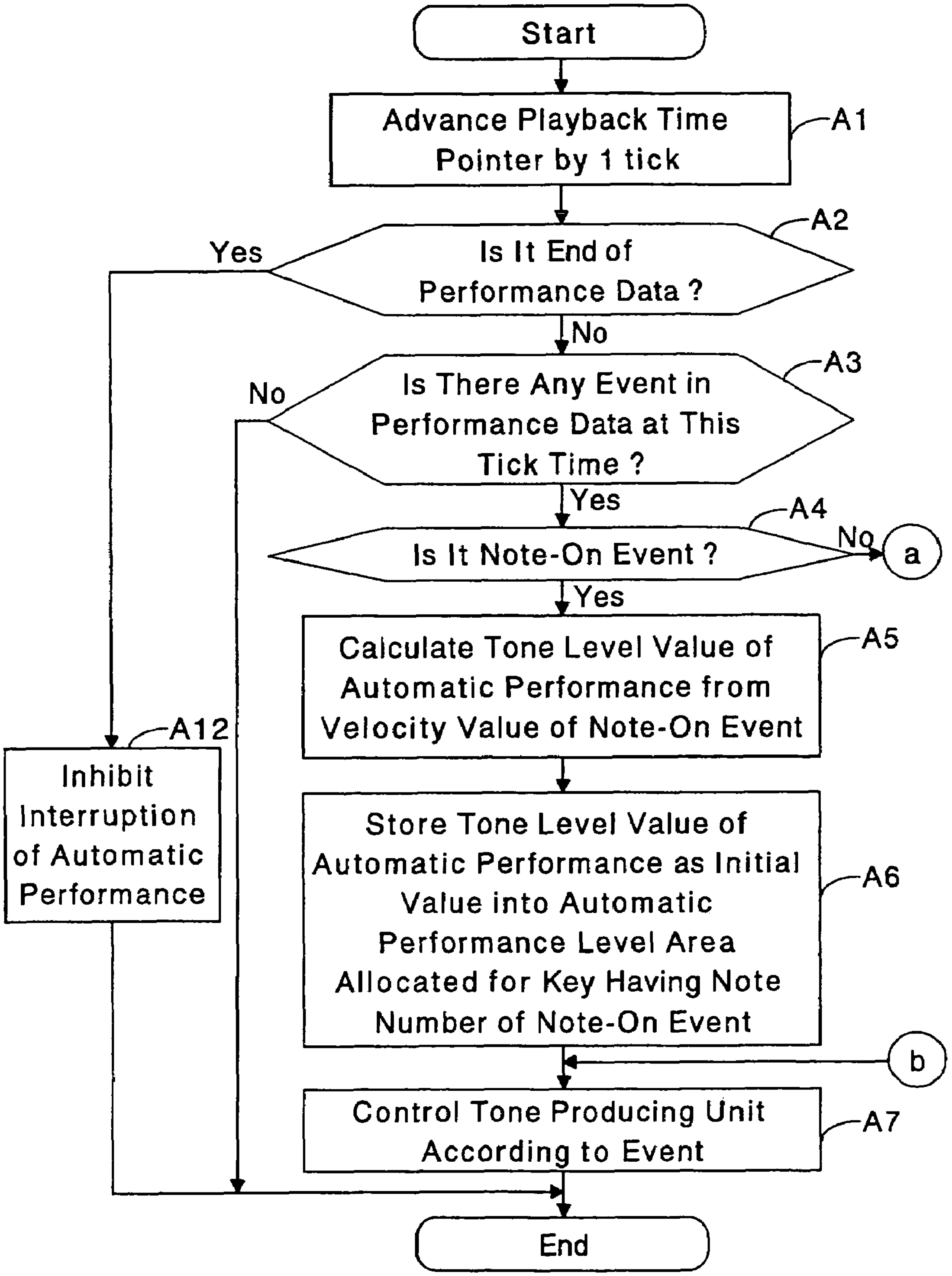

*Fig. 6b* Processing of Executing Automatic Performance (Part 2)
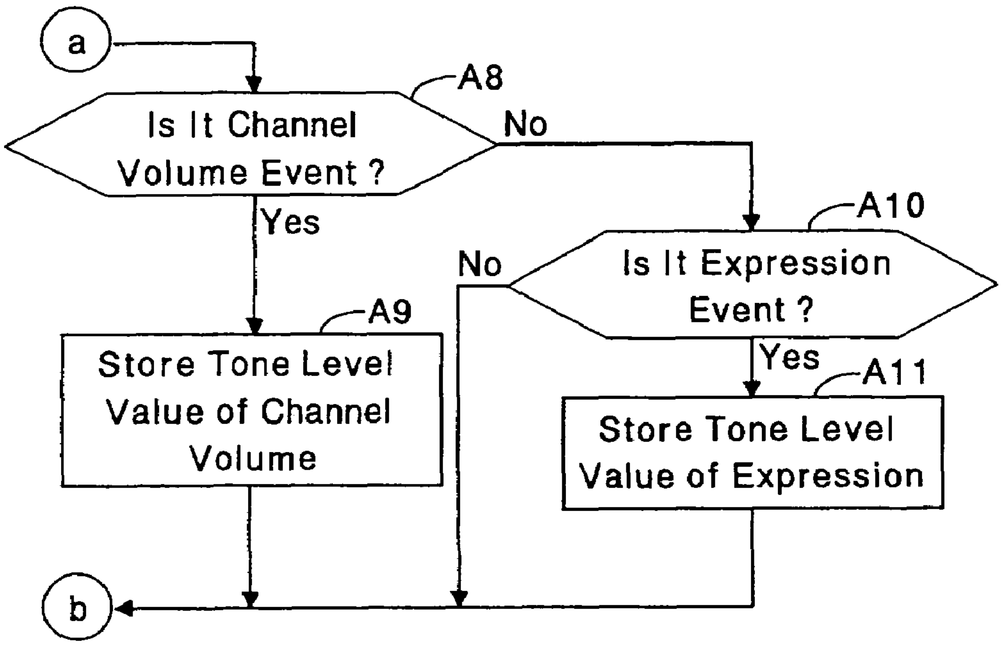

*Fig. 7a* Processing for Manual Performance (Part 1)
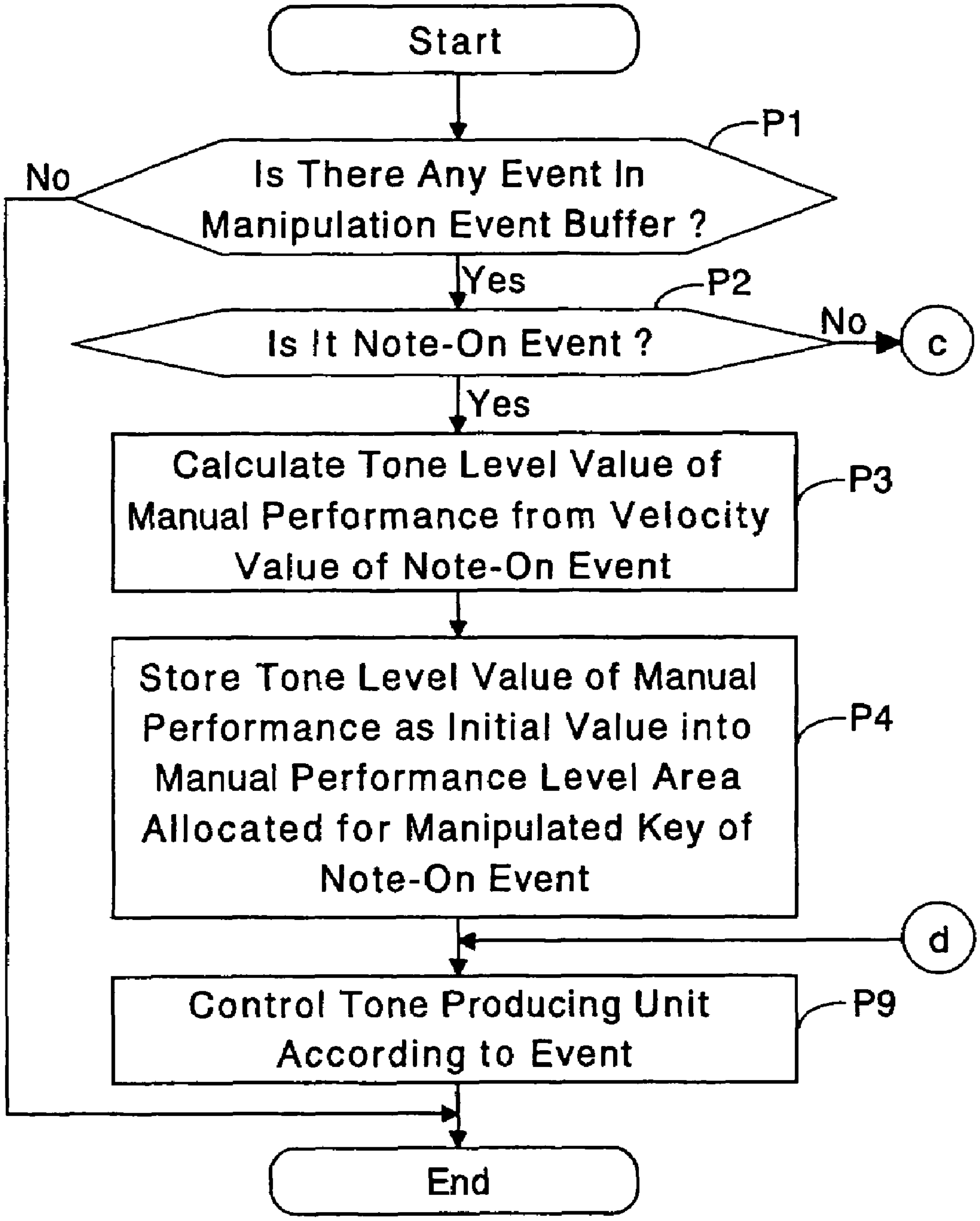

*Fig. 7b* Processing for Manual Performance (Part 2)
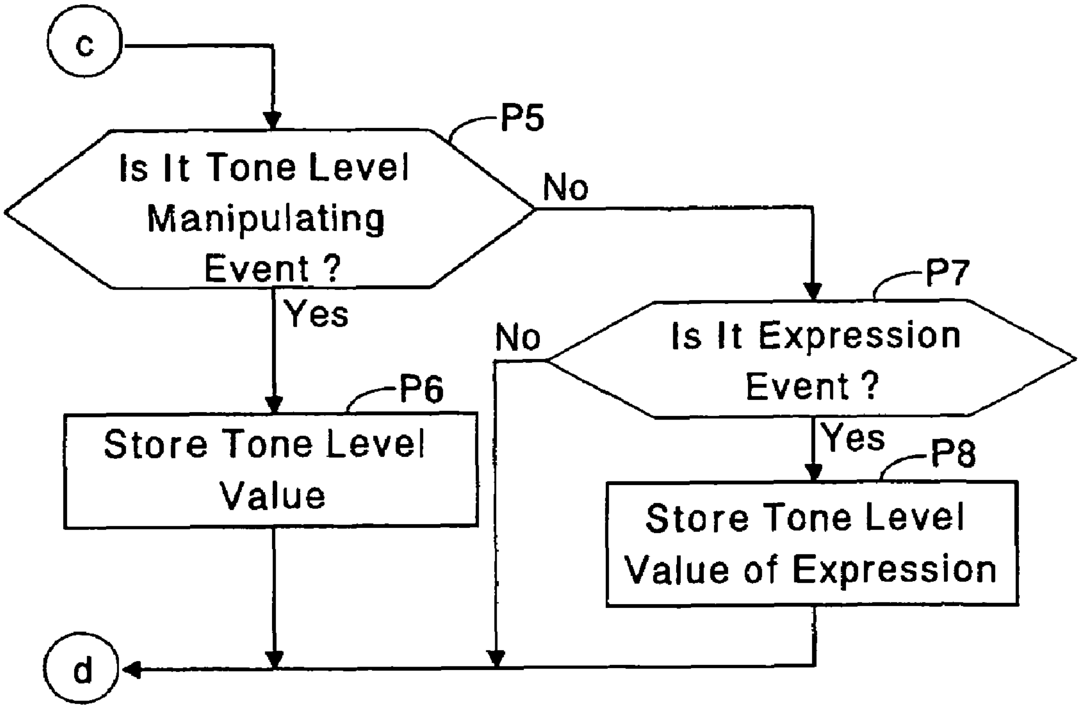

*Fig. 8* Processing for Indicating Velocities
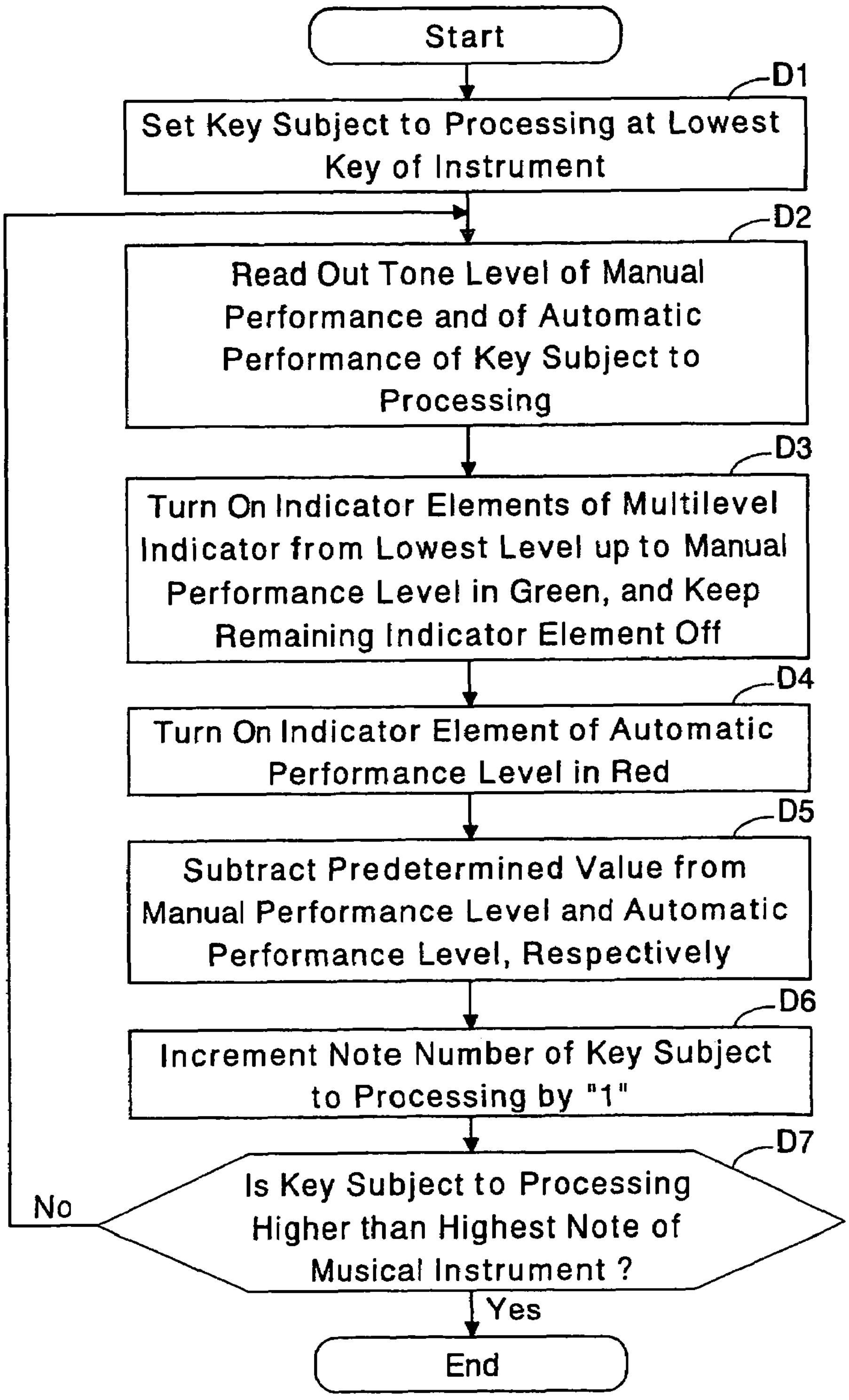

ELECTRONIC MUSICAL INSTRUMENT WITH VELOCITY INDICATOR

TECHNICAL FIELD

The present invention relates to an electronic musical instrument having a velocity indicator, more particularly to an electronic musical instrument of a keyboard type which presents bar-graphic indications of the respective tone levels of the individual keys in the keyboard, and a computer readable medium containing program instructions for presenting bar-graphic indications of the tone levels of the individual keys on a keyboard type electronic musical instrument.

BACKGROUND INFORMATION

There has been known in the art such a type of keyboard musical instrument which comprises light emitting elements respectively provided in correspondence to the individual music-playing keys to make illuminative displays in association with the individual key actuations, as disclosed, for example, in unexamined Japanese patent publication No. 2003-99067 in which visual indicators emit light in varying color or intensity according to the respective tone properties of the corresponding keys, and in unexamined Japanese patent publication No. H10-222160 in which light emitting diodes flash according to the key actuation by the player as a performance display or according to the music teaching data as a guidance to the student. The former publication discloses a keyboard musical instrument having indicator elements which are arrayed horizontally on the back of the instrument individually corresponding to the individual keys and emit light in intensity representing the velocity or strength of the depressed keys.

With the keyboard musical instrument disclosed in the former publication, however, the depression strength of each key is expressed by the light intensity of each corresponding light emitting element among those arrayed in a line horizontally, and it is accordingly rather difficult for the user (or player) to know precise intensities of each key depression strength. In addition, the user cannot compare his/her key depression strengths with those of the exemplary performance.

SUMMARY OF THE INVENTION

It is, therefore, a primary object of the present invention to solve the above-mentioned drawbacks with the conventional apparatuses and methods, and to provide a novel type of electronic musical instrument with which the user can be visually informed of each key depression strength of his/her own manual performance (playing music) and which can serve as an interior with beautiful illuminations as well.

According to the present invention, the object is accomplished by providing an electronic musical instrument comprising: a keyboard including a plurality of individual keys for playing individual musical notes and arrayed in a first direction; a detecting device for detecting respective key depression velocities of the individual keys; an indicator device which presents a plurality of bar-graphic indications respectively for the individual keys in the keyboard, the bar-graphic indications being arrayed side by side in the first direction, each the bar-graphic indication being elongate in a second direction which is perpendicular to the first direction and representing the key depression velocity of each the individual key in a first appearance; and an indicator controlling device for controlling the bar-graphic indications respectively in accordance with the detected key depression velocities. Thus, when a key is depressed in the keyboard, the key depression velocity (strength) is detected and the indicator device presents a bar-graphic indication for the depressed key with a bar length (perpendicular to key arraying direction) representing the depression velocity. The user can easily understand each key depression strength of his/her own manual performance. The varying bar graphs will give a beautiful illumination effect.

In an aspect of the present invention, the electronic musical instrument may further comprise: a tone producing device for producing tones of the played musical notes; a general tone level control device for controlling a general level of the tones of the played musical notes; and wherein the detecting device may also detect the general level as controlled by the general tone level control device; the indicator controlling device may control the bar-graphic indications of the keys which correspond to the played musical notes in accordance with the detected key depression velocities and with the general level of the tones of the played musical notes in the first appearance. This provides combined resultant levels of the individual tones which will be actually produced from the instrument.

In another aspect of the present invention, the electronic musical instrument may further comprise: a performance data providing device for providing reference performance data which contains note data representing notes of a reference performance and velocity data representing respective tone levels of the notes of the reference performance; and wherein the indicator device may also present bar-graphic indications of the tone levels of the notes of the reference performance in a second appearance which is different from the first appearance. The second appearance may be different from the first appearance in color. Thus, the user can clearly compare the key depression strengths of his/her performance with those of the reference performance, which will be helpful in practicing a musical performance. The different appearances of the indications will enhance the illumination effect considerably, particularly where the colors are different.

In a further aspect of the present invention, the electronic musical instrument may further comprise: a tone producing device for producing tones of the played musical notes and tones of the notes of the reference performance; and a general tone level control device for controlling a general level of the tones of the played musical notes; and wherein the detecting device is also for detecting the general level as controlled by the general tone level control device; the reference performance data further contains general performance level data for controlling a general level of the tones of the notes of the reference performance; and the indicator controlling device is for controlling the bar-graphic indications of the keys which correspond to the played musical notes in accordance with the detected key depression velocities and with the general level of the tones of the played musical notes in the first appearance, and for controlling the bar-graphic indications of the keys which correspond to the notes of the reference performance in accordance with the velocity data contained in the reference performance data and with the general performance level data contained in the reference performance data in the second appearance. This provides combined resultant levels of the individual tones which will be actually produced from the instrument according to the user's manual performance together with combined resultant levels of the tones in the reference performance. This will be helpful in practicing a musical performance.

According to the present invention, the object is further accomplished by providing a computer readable medium for use in an electronic musical instrument of a data processing type comprising a computer, a keyboard including a plurality of individual keys for playing individual musical notes and arrayed in a first direction, and an indicator device for presenting a plurality of bar-graphic indications respectively for the individual keys in the keyboard, the bar-graphic indications being arrayed side by side in the first direction, each bar-graphic indication being elongate in a second direction which is perpendicular to the first direction, and the medium containing program instructions executable by the computer for causing the computer to execute: a process of detecting respective key depression velocities of the individual keys; and a process of controlling the bar-graphic indications respectively in accordance with the detected key depression velocities of the individual keys to cause the bar-graphic indications to represent the key depression velocity of each individual key. Thus, when a key is depressed in the keyboard, the key depression velocity (strength) is detected and the indicator device presents a bar-graphic indication for the depressed key with a bar length (perpendicular to key arraying direction) representing the depression velocity. The user can easily understand each key depression strength of his/her own manual performance. The varying bar graphs will give a beautiful illumination effect.

As will be apparent from the above description, the present invention can be practiced not only in the form of an apparatus, but also in the form of a computer program to operate a computer or other data processing devices. The invention can further be practiced in the form of a method including the steps mentioned herein.

In addition, as will be apparent from the description herein later, some of the structural element devices of the present invention are structured by means of hardware circuits, while some are configured by a computer system performing the assigned functions according to the associated programs. The former may of course be configured by a computer system and the latter may of course be hardware structured discrete devices. Therefore, a hardware-structured device performing a certain function and a computer-configured arrangement performing the same function should be considered a same-named device or an equivalent to the other.

BRIEF DESCRIPTION OF THE DRAWINGS

For a better understanding of the present invention, and to show how the same may be practiced and will work, reference will now be made, by way of example, to the accompanying drawings, in which:

FIG. 2 is a partial plan view illustrating the configuration of a multilevel indicator and a keyboard in an electronic musical instrument according to an embodiment of the present invention;

FIGS. 3*a*-3*c* are charts each illustrating an exemplary pattern of dual indications of tone levels in a manual performance and an automatic performance;

FIG. 4 is a chart illustrating the data structure of an automatic performance data according to an embodiment of the present invention;

FIG. 5 is a flow chart describing an example of the processing for starting an automatic performance according to an embodiment of the present invention;

FIGS. 6*a* and 6*b* are, in combination, a flow chart describing an example of the processing of executing an automatic performance according to the present invention;

FIGS. 7*a* and 7*b* are, in combination, a flow chart describing an example of the processing for a manual performance according to the present invention; and FIG. 8 is a flow chart describing an example of the processing for indicating velocities according to an embodiment of the present invention.

DETAILED DESCRIPTION OF EMBODIMENTS OF THE INVENTION

Figure 1:
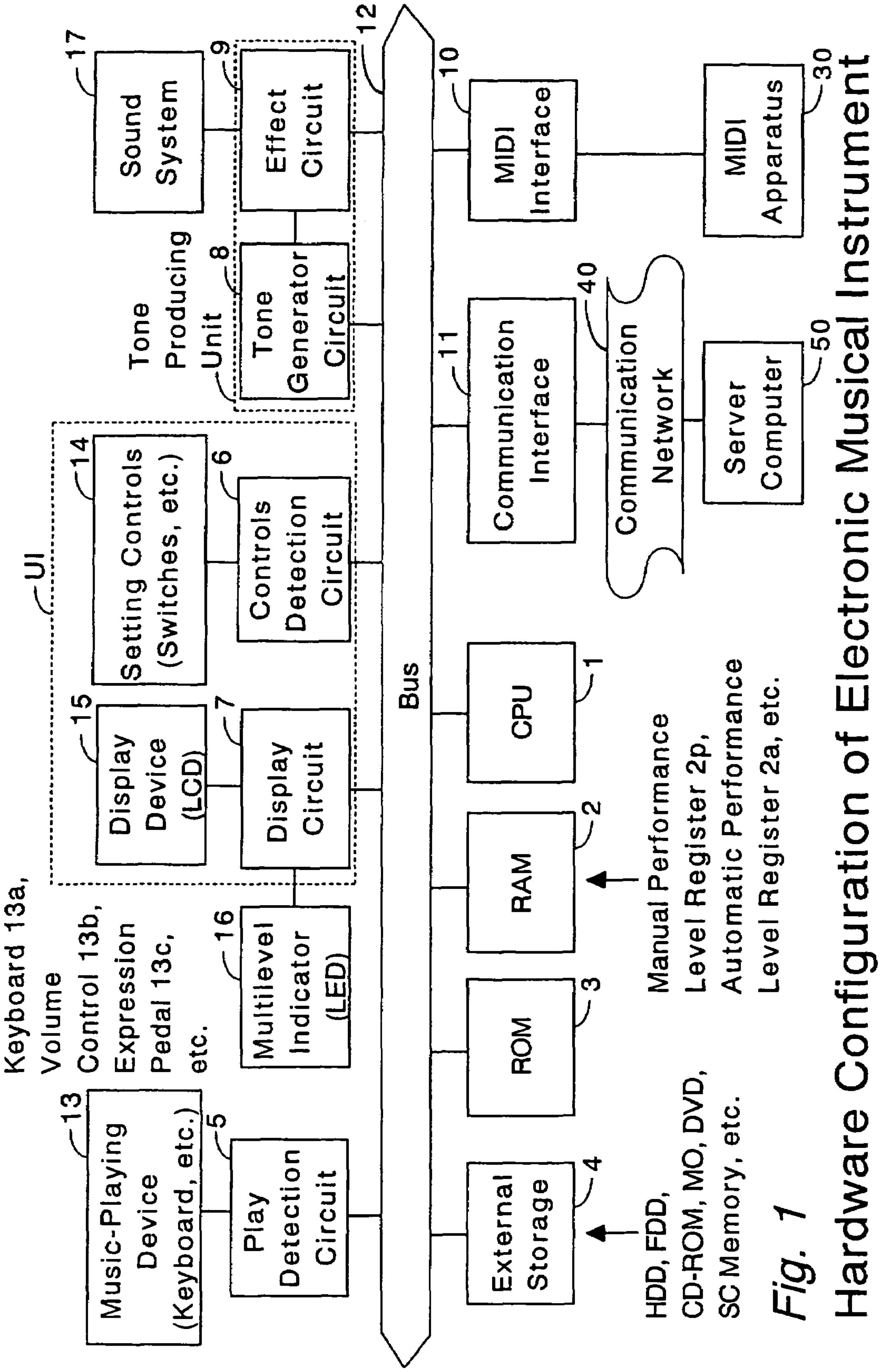
FIG. 1 is a block diagram illustrating the overall hardware configuration of an electronic musical instrument incorporating a velocity indicator according to an embodiment of the present invention.

The present invention will now be described in detail with reference to the drawings showing preferred embodiments thereof. It should, however, be understood that the illustrated embodiments are merely examples for the purpose of understanding the invention, and should not be taken as limiting the scope of the invention.

Overall System Configuration

FIG. 1 shows a block diagram illustrating the overall hardware configuration of an electronic musical instrument incorporating a velocity indicator according to an embodiment of the present invention. This electronic musical instrument is a kind of computer which processes data and comprises a central processing unit (CPU) 1, a random access memory (RAM) 2, a read-only memory (ROM) 3, an external storage device 4, a play detection circuit 5, a controls detection circuit 6, a display circuit 7, a tone generator circuit 8, an effect circuit 9, a MIDI interface 10 and a communication interface 11, all of which are connected with each other by a system bus 12.

The CPU 1 conducts various music data processing including velocity indications as operated on the clock pulses from a timer. The RAM 2 is used as work areas for temporarily storing various data necessary for the processing. More particularly, the work areas include, for example, a manipulation event buffer for memorizing momentarily generated data of the individual manipulations for playing music (manual performance), a tone level register for storing the general tone level values (volumes) of the overall notes of the respective performance parts (i.e. channels) in the manual performance and the automatic performance data, an expression register for storing the controlled general tone level (expression level) for the overall notes in the manual performance or in the automatic performance data, a manual performance level register for storing the individual tone level values of the manual performance as calculated from the velocity values acquired from the manual performance, an automatic performance level register for storing the tone level values of the automatic performance as calculated from the velocity values of the note events in the automatic performance data, and so forth.

The ROM 3 stores beforehand various control programs including the velocity indicating program, preset automatic performance data, and so forth to execute the data processing of various musical data. The external storage device 4 may include a built-in storage medium such as a hard disk (HD) as well as various portable external storage media such as a compact disk read-only memory (CD-ROM), a flexible disk (FD), a magneto-optical (MO) disk, a digital versatile disk (DVD), a semiconductor (SC) memory such as a small-sized memory card like Smart Media (trademark) and so forth. Automatic performance data and any other kinds of data can be stored in any storage media of such external storage device 4.

The play detection circuit 5 is connected to a music-playing device 13, which includes a keyboard **13*a* as a main control device, a volume control 13*b* (of a dial type, a slider type, +/−switch type, or else) and expression pedal 13*c* and other variable controls as auxiliary control devices. The play detection circuit 5 detects the user's operations of a music-playing device 13 and introduces data representing the musical performance into the data processor mainframe. The controls detection circuit 6 is connected to setting controls 14 including switches on a control panel and a mouse device, and detects the user's operations of the setting controls 14 and introduces data representing such user's operations into the data processor mainframe. The display circuit 7 is connected to a display device 15 such as an LCD for displaying various screen images and pictures including a performance data selecting window, and to a multilevel indicator device 16 including indicator elements such as LEDs arrayed in the vicinity of the keyboard 13*a* and other indicator devices (not shown), if any, and controls the displayed or indicated contents and lighting conditions of these devices according to instructions from the CPU 1, and also presents GUIs and performance contents for assisting the user in operating the music-playing device 13 and various controls 15**.

The setting controls 14, the controls detection circuit 6, the display circuit 7 and the display device 15 serve collectively as a user interface (UI) for accepting requests from the user. The multilevel indicator device 16 can indicate the velocities of the key depressions in the music-playing manipulations of the keys in the keyboard by the user (player) and the velocities included in the automatic performance data from the memory 3 or the storage device 4. The term "velocity" means a key depression speed or strength which is a physical value and also means the data which represents such a value, and further covers the meaning of a tone level in the field of the electronic musical data processing, derived from the fact that the sound volume (tone level) from the piano is determined by the key depressing strength or speed. In this specification, accordingly, the term "velocity" means both an actual depressing speed or strength of a key and a tone level (or volume) of the note represented by the note data as well.

The tone generator circuit 8 and the effect circuit 9 may be incorporated with software, respectively, and constitute a tone producing unit which to produce tone signals for musical performances. The tone generator circuit 8 generates musical tone signals of the note pitches and with the tone levels respectively corresponding to the keys and the velocities as determined by the key depression data from the play detection circuit 5 based on the real-time music playing operations on the keyboard **13*a* or by the note event data in the automatic musical performance data read out from the memory 3 or the storage 4. The effect circuit 9 includes an effect imparting DSP (digital signal processor) and imparts, to the musical tone signals outputted from the tone generator circuit 8, various intended tone effects including a general tone level control according to the control on the expression pedal or to the tone level event in the automatic musical performance data. To the effect circuit 9 is connected a sound system 17, which includes a D/A converter, an amplifier and a loudspeaker, and emits audible sounds based on the effect imparted musical tone signals from the effect circuit 9**.

To the MIDI interface 10 is connected a MIDI apparatus 30 so that MIDI musical data including musical performance data are exchanged between this electronic musical instrument and the separate or remote MIDI apparatus 30 so that the exchanged data are used in this system. The communication interface 11 is connected to a communication network 40 such as the Internet and a local area network (LAN) so that control programs, reference musical performance data and other various data, etc. can be received or downloaded from an external server computer 50 or the like for use in this system, and also can be temporarily stored in the RAM 2 or further in the external storage 4 for later use.

Bar-Graphic Indicator

An electronic musical instrument according to an embodiment of the present invention comprises a bar-graphic indicator device provided in the vicinity of the keyboard and capable of presenting a plurality of bar-graphic indications respectively for the individual keys in the keyboard. An embodiment of the indicator device is a multilevel indicator device and has a plurality of LED indicator elements constituting a plurality of multilevel indicator units arrayed in correspondence to the music-playing keys arrayed in the keyboard, in which each multilevel indicator unit is constituted by a number of LED elements aligned in a line perpendicular to the array direction of the keys and the number of lighted LED elements is varied according to the velocity of the corresponding key depressed by the user to present a bar-graphic indication of the magnitude of the velocity of the depressed key. FIG. 2 illustrates, in a partial plan view, the configuration of the multilevel indicator device and the keyboard in an electronic musical instrument according to an embodiment of the present invention.

The multilevel indicator device 16 is constituted by a plurality of indicator elements DEs (some shown in black and some in white in FIG. 2) arrayed in a matrix form, and is disposed in a rear panel in the vicinity of the keyboard **13*a*. Each column of the indicator elements DEs includes a number (n) of indicator elements DE1-DEn and is aligned with each corresponding key in the keyboard 13*a* along the direction perpendicular to the direction K of the key array. The rear panel may be horizontal, vertical or slant in relation to the keyboard 13*a*. The indicator elements DE1, DE2, . . . , DEn are referred to as level 1, level 2, . . . , level n, respectively from bottom to top. FIG. 2 covers the part ranging from A#3 key through D#5 key in the keyboard 13*a* with the corresponding indicator elements EDs in the multilevel indicator device 16, including, in this example, twelve (n=12) indicator elements ED1, ED2, . . . , ED12** per column (i.e. key). Black rectangles mean extinguished indicator elements ED (i.e. off-elements) and white rectangles mean lighted indicator elements ED (i.e. on-elements) in the figure.

Each indicator element DE of the multilevel indicator device 16 is constituted by a polychromatic LED and is capable of selectively emitting light in different colors such as in green (G) or blue, in red (R) and in yellow (Y) when energized. The indicator elements DE1-DE12 of each column are controlled to light in a color (e.g. green G) and a number (ip) in accordance with the velocity of the corresponding key to present a colored bar-graphic indication of the velocity. The number ip (where, 1=<ip <=n) of indicator elements DE1-DEip represents the magnitude of the velocity. The indicator element DEip shows the highest level on-element, i.e. of level 9 in FIG. 2.

For example, when the user depresses the key of C4 (middle C) with some strength (or velocity), the highest on-level value (in this case, ip=9) is calculated from the velocity value representing the depression strength of C4 key, and the indicator elements DE1-DE12 in the column of C4 key are controlled to light from ED1 to ED9 in green color as shown in FIG. 2.

To summarize, the multilevel indicator device 16 comprised of a plurality of indicator elements EDs made of polychromatic light emitting elements such as colored LEDs are arrayed in a matrix form is disposed in the vicinity of the keyboard 13*a*. Each column of the multilevel indicator device 16 corresponds to each of the keys A#3, B3, . . . , D5, D#5 in the keyboard 13*a*, and includes a number (n=12) of indicator elements DE1-DEn aligned in the direction perpendicular to the key array direction K to present a bar-graphic indication. The number of columns may preferably be equal to the number of keys in the keyboard to cover the whole note compass of the electronic musical instrument, but may be less than the number of keys to cover such a fractional range of the keyboard that includes the frequently used keys in the usual performances. When a key in the keyboard 13*a* is depressed, the velocity of the depressed key is detected, and a number of indicator elements DE1-DEip (where, 1=<ip<=n) among the indicator elements DE1-DEn in the column corresponding to the depressed key are turned on in green (G), the number corresponding to the velocity of the depressed key, to represent the velocity with a bar graph in the color of green. In the case of automatic performance data representing a reference performance to be used for practicing musical performance, the velocity of each note event (i.e. key) in the reference performance data is indicated in another color such as red by the indicator column of the corresponding key.

Dual Indications of Manual Performance and Automatic Performance

The electronic musical instrument as an embodiment of the present invention is configured to give an automatic reference performance of a music piece or a performance part of the music piece based on automatic reference performance data provided by a performance data providing device such as by reading out reference performance data stored beforehand in the storage or memory so that the user can practice playing the electronic musical instrument with reference to the reference performance. In such a situation, the electronic musical instrument can present bar-graphic indications of the tone levels of the notes in the reference performance in addition to the bar-graphic indications of the velocities of the keys depressed in the manual performance by the user, simultaneously and easily distinguishably between the two performances. FIGS. 3*a*-3*c* illustrate, in three different modes, exemplary patterns of dual indications of the velocities of the notes in a manual performance and an automatic performance.

In the electronic musical instrument of this embodiment, the automatic performance data stored in the memory 3 or storage 4 are read out and temporarily stored into the RAM 2, and when the user practices playing music by depressing the keys with reference to the corresponding performance part (e.g. right-hand part, left-hand part, melody part, accompaniment part, etc.) of the reference performance given by the automatic performance data, the velocity or strength (i.e. manual performance level Lp) of each depressed key is stored in a manual performance level register 2*p* in the RAM 2 and the tone level (i.e. automatic performance level La) of each note event in the automatic performance data is stored in an automatic performance level register 2*a* in the RAM 2, with both of the levels Lp and La of each key are displayed simultaneously by the multilevel indicator unit (16) for each key in various modes as shown FIGS. 3*a*-3*c*.

In the figures, a black rectangle means the indicator element ED is extinguished (i.e. in the off state), while a white rectangle means the indicator element ED is lighted in a color of green (G), red (R) or yellow (Y) as shown. In the embodiment, the green (or may be blue) lighting is for representing the manual performance level Lp, while the red lighting is for representing the automatic performance level La. In the following description about FIGS. 3*a*-3*c*, the performance levels Lp and La each is quantized in an integer value for the highest level ip or ia of the indication.

In the first mode shown in FIG. 3*a*, the manual performance level Lp is indicated in a bar graph by lighting the indicator elements from DE1 through DEip in green (G). The automatic performance level La, on the other hand, is indicated by lighting the single indicator element DEia in red (R) only among the indicator elements from DE1 through DEia. According this rule, for example, when the manual performance level Lp (ip=9) is greater than the automatic performance level La (ia=6), i.e. Lp>La as shown in Example a1, only the highest level indicator element DE6 is lighted in red with priority over green to indicate the automatic performance level La, and the indicator elements DE1-DE5 and DE7-DE9 are lighted in green to indicate the manual performance level Lp, excepting the indicator element DE6.

On the other hand, when the manual performance level Lp (ip=5) is less than the automatic performance level La (ia=7), i.e. Lp<La as shown in Example a2, the indicator elements DE1-DE5 are lighted in green to indicate the manual performance level Lp, and only the highest level indicator element DE7 is lighted in red to indicate the automatic performance level La. In this case, the indicator element DE6 between the highest level indicator element DE7 of the automatic performance data and the highest level indicator element DE5 of the manual performance data is kept extinguished. If the manual performance level Lp is equal to the automatic performance level La, i.e. Lp=La, then ip=ia, the highest level indicator DEia is lighted in red (R) with priority over green (G).

In the second mode shown in FIG. 3*b*, the manual performance level Lp is indicated in a bar graph by lighting the indicator elements from DE1 through DEip in green (G), and the automatic performance level La is indicated in a bar graph by lighting the indicator elements from DE1 through DEip in red (R), except that the indicator elements in the overlapped range are lighted in yellow (Y) with priority over green (G) and red (R). For example, when the manual performance level Lp (ip=9) is greater than the automatic performance level La (ia=6), i.e. Lp>La as shown in Example b1, the indicator elements DE1-DE6 in the overlapped range are lighted in yellow (Y) and the indicator elements DE7-DE9 beyond the overlapped range are lighted in green (G). Although there is no indicator element lighted in red (R), the bar graph by the indicator elements lighted in yellow (Y) tells the automatic performance level La.

On the other hand, when the manual performance level Lp (ip=5) is less than the automatic performance level La (ia=7), i.e. Lp<La as shown in Example b2, the indicator elements DE1-DE5 in the overlapped range are lighted in yellow, and the indicator elements DE6-DE7 beyond the overlapped range are lighted in red (R). Although there is no indicator element lighted in green (G), the bar graph by the indicator elements lighted in yellow (Y) tells the manual performance level Lp. If the manual performance level Lp is equal to the automatic performance level La, i.e. Lp=La, then ip=ia, all the lighted indicators DE1-DEip (=DEia) are in yellow (Y).

In the third mode shown in FIG. 3*c*, the manual performance level Lp is indicated in a bar graph by lighting the indicator elements from DE1 through DEip in green (G), and the automatic performance level La is indicated in a bar graph by lighting the indicator elements up to DEia in red (R), with a priority on the manual performance level Lp over the automatic performance level La. For example, when the manual performance level Lp (ip=9) is equal to or greater than the automatic performance level La (ia=6), i.e. Lp>=La as shown in Example c1, the indicator elements DE1-DE9 are lighted in green (G) with priority over the indication in red (R) for the automatic performance level La. When the manual performance level Lp (ip=5) is less than the automatic performance level La (ia=7), i.e. Lp<La as shown in Example c2, the indicator elements DE1-DE5 are lighted in green (G), and the indicator elements DE6-DE7 beyond the level Lp are lighted in red (R).

Alternatively, in the modes of FIGS. 3*a* and 3*c*, when the manual performance level Lp is equal to the automatic performance level La, i.e. Lp=La, the highest level indicator DEip (=DE ia) may be lighted in yellow (Y), or may be lighted alternatingly in green (G) and red (R), or may be lighted in green (G) or red (R) blinkingly.

FIG. 4 describes an example of the data structure of an automatic performance data which can be utilized when the manual performance level and the automatic performance level are indicated simultaneously as described above. The data structure of the automatic performance data is in the SMF format in the following explanation, but it should be understood by those skilled in the art that other format may be employed accordingly.

The automatic performance data stored in the memory 3 or the storage 4 contains at least one track chunk carrying performance data of a reference performance to be used as a model performance for keyboard manipulations by the student. In the example of FIG. 4, the automatic performance data is prepared with separate tracks for the left-hand part performance and the right-hand part performance, and comprises a header chunk Hc, a left hand track chunk Lc, a right hand track chunk Rc, an accompaniment track chunk Ac, etc.

The header chunk Hc includes codes representing the format, the number of track, the time resolution followed by the fundamental information about the performance data. The left hand chunk Lc, the right hand chunk Rc and the accompaniment chunk Ac contain the respective performance data of the left hand part, the right hand part and the accompaniment part, and can be utilized as a reference part for the performance practice by the user, i.e. the player.

In the following description, the performance data of the right hand track chunk Rc is used as the model keyboard performance, namely as a reference part for practice among the plurality of track chunks. The accompaniment chunk Ac includes an accompaniment track which will be automatically played back through the tone producing unit 8 and 9 together with the reference part for practice while the user is practicing the performance of that part.

Each of the track chunks Lc, Rc and Ac contains data of a plurality of events. For example, the right hand chunk Rc contains data of tone level controlling events such as a channel volume event Cv and an expression event Ex, note-on events Nn and note-off events Nf of the notes in the performance such as of C4 note and E4 note, a polyphonic key pressure event Pp, and so forth.

Each of the event data blocks contains information of a delta time which represents the lapse of time from the preceding event, information of the type of event such as control change, note-on and note-off, control numbers such as of channel volume (general tone level for notes in the channel) and expression control level (general tone level for notes as controlled by the expression control), note number of each musical note, tone level values Cva and Exa which represent the channel volume and the expression control level, a velocity value Nna of each note, and information which represents polyphonic key pressure.

The unit of the delta time is expressed by the unit of time resolution as designated in the header chunk, and may be a "tick" where one beat is measured as 96 ticks. The velocity value Nna of each note and the general tone level values Cva and Exa of channel volume and expression level are used in indicating the automatic performance level La by means of the multilevel indicator unit (16), in which the reference velocity indication may represent not only the velocity value Nna alone, but also such velocity value added with the tone levels Cva and Exa of the tone level control events such as the channel volume event and the expression control event.

Processing Flow in Embodiment

An electronic musical instrument according to an embodiment of the present invention conducts processing for starting an automatic performance, processing of executing an automatic performance, processing for a manual performance, and processing for velocity indications according to a computer program for reading performance data and indicating velocities so as to indicate the manual performance levels and the automatic performance levels in contrast to each other by means of the multilevel indicator device 16. FIGS. 5-8 show processing flows describing the procedures of starting an automatic performance, executing an automatic performance, dealing with a manual performance and indicating performance levels according to an embodiment of the present invention.

The processing for starting an automatic performance of FIG. 5 is conducted to prepare for allowing periodical timer interruptions at timing of one tick time interval for the execution of an automatic performance processing based on an automatic performance data, which will be described later with reference to FIGS. 6*a* and 6*b*. As the processing for starting an automatic performance is initiated, the CPU 1 controls the display device 15 to display a screen for the user to select an automatic performance data file and let the user select an automatic performance data file and its performance part to play back as the reference (or model performance) for his/her practice by means of the user interface (UI) 14 and 15 at a step AS1 in FIG. 5. Then, a step AS2 reads out the selected automatic performance data file from the memory 3 or storage 4 on to the RAM 2, and sets the playback time pointer to the top of the performance data of the reference part. Next, a step AS3 allows timer interruptions of the automatic performance processing of FIGS. 6*a* and 6*b* before this processing for starting an automatic performance comes to its end.

After the timer interruptions for the automatic performance processing are allowed at the step AS3 in the processing for starting an automatic performance (FIG. 5), the first timer interruption initiates the processing of executing an automatic performance of FIGS. 6*a* and 6*b*, in which the CPU 1 first initializes the respective registers for the automatic performance in the RAM 2, and sets an automatic performance level La="0" in the automatic performance level register 2*a* at each key memory area and sets the respective preset values of the tone level values Cva and Exa in the tone level register and the expression register. The process flow passes through a step A1 without doing anything (only at the first pass) to come to a step A2. When the processing of an automatic performance is started by the second timer interruption and thereafter, the process flow conducts the step A1 to advance the playback time pointer by "1" (one) tick before going to the step A2.

The step A2 judges whether the current playback pointer points the end of the performance data, and if the judgment is negative (No), the process flow moves forward to a step A3. The step A3 is to detect any event in the performance data at this tick time, and if no event is detected, i.e. if the judgment is negative (No), the process flow skips to the end of this processing to terminate the processing of executing an automatic performance at this timer interruption.

When the step A3 detects an event in the performance data, i.e. if the judgment is affirmative (Yes), the process flow goes forward to a step A4, which judges whether the detected event is a note-on event Nn. If the judgment at the step A4 is affirmative (Yes), the process flow proceeds to a step A5, which calculates the tone level value La of the automatic performance from the velocity value Nna of the note-on event Nn according to the following formula (1):

$$La=(Nna/128)\times(Cva/128)\times(Exa/128)\times n\times C \quad (1)$$

where the symbols Cva and Exa represent the respective tone levels of the channel volume (general tone level for the channel) and the expression (general tone level for the tones as controlled by the expression control) stored in the tone level register and the expression register for the automatic performance, and are normalized to take values between “0” and “127,” and the symbol C represents an indication control factor (C=<1) for controlling lighting widths of the indicator elements.

A step A6 stores the tone level value La of the automatic performance as calculated at the step A5 above into the predetermined area of the automatic performance level register 2*a*, i.e. the memory area allocated for the key corresponding to the note number of the note-on event Nn. Then, a step A7 controls the tone producing unit 8-9 in accordance with the content of the note event Nn before ending the processing of executing an automatic performance of this time (tick).

On the other hand, if the step A4 judges that it is not a note-on event Nn, i.e. negative (No), the process goes to a step A8 (FIG. 6*b*), which judges whether it is a channel volume event Cv (defining the general static tone volume of the channel) or not. If the judgment rules affirmative (Yes), the process flow goes to a step A9 to store the tone level value Cva of the channel volume event Cv into the tone level register before going to the step A7 (FIG. 6*a*). The step A7 controls the tone producing unit 8-9 in accordance with the content of the channel volume event Cv before ending the processing of executing an automatic performance of this time.

In case it is not a channel volume event Cv, the step A8 judges negative (No), and the process goes to a step A10, which judges whether it is an expression event Ex (defining a general dynamic tone level of the performance) or not. If it is an expression event, the step A10 judges affirmative (Yes) and the process moves forward to a step A11 to store the tone level value Exa of the expression event Ex into the expression register. Then, the process flow goes to the step A7 (FIG. 6*a*) to control the tone producing unit 8-9 in accordance with the content of the expression event Ex before ending the processing of executing an automatic performance of this time.

Further, if the detected event is a note-off event Nf or a polyphonic key pressure event Pp or else which is an event other than the expression event, the step A10 judges negative (No), and the process flow skips to the step A7 (FIG. 6*a*), which controls the tone producing unit 8-9 in accordance with the content of the detected event before ending the processing of executing an automatic performance of this time.

Until the playback time pointer reaches the end of the performance data, the step A2 judges negative (No), and the processing for the detected event will be repeated by the step A1 through A11. Once the playback time pointer reaches the end of the performance data, the step A2 judges affirmative (Yes), the process flow goes to a step A12 which inhibits the interruption for an automatic performance, and the processing of executing an automatic performance comes to an end.

The flow chart of FIGS. 7*a* and 7*b*, in combination, describes the procedure in an example of the processing for a manual performance by means of the music playing device 13 according to the present invention. This processing for a manual performance is executed periodically with a time interval (e.g. 5 ms or less) which will not cause unnaturalness in the music playing by the user according to the timer interruptions after the initiation of the processing for a manual performance.

After the initiation of this processing, as the processing for a manual performance starts by the first timer interruption, the CPU 1 first initializes the respective registers for the manual performance in the RAM 2, and sets a manual performance level Lp=“0” in the automatic performance level register 2*p* at each key memory area and sets the respective preset values of the tone level values Cva and Exa in the tone level register and the expression register before starting with a step P1. When the processing for a manual performance is started by further timer interruptions thereafter, the processing will directly start at the step P1.

The step P1 detects any event in the manipulation event buffer in the RAM 2 at this interruption time, and if no event is detected, i.e. if the judgment is negative (No), the process flow skips to the end of this processing to terminate the processing for a manual performance at this timer interruption. When the step P1 detects a manipulation event, i.e. if the judgment at the step P1 is affirmative (Yes), the process flow goes forward to a step P2 and execute the respective processes thereafter to come to a step P9, which controls the tone producing unit 8-9 in accordance with the content of the event before ending this processing for a manual performance at this timer interruption.

More particularly, the step P2 judges whether the detected event is a note-on event caused by the manipulation of a key by the user. If the judgment at the step P2 is affirmative (Yes), the process flow proceeds to a step P3, which calculates the tone level value Lp of the manual performance from the velocity value Nnp of the manual note-on event according to the following formula (2):

$$Lp=(Nnp/128)\times(Cvp/128)\times(\mathrm{Exp}/128)\times n\times C \quad (2)$$

where the symbols Cvp and Exp represent the respective general tone levels determined by the volume control and the expression control stored in the tone level register and the expression register for the manual performance, and are normalized to take values between “0” and “127,” and the symbol C represents an indication control factor (C=<1) for controlling lighting widths of the indicator elements as in the case of formula (1) above.

A step P4 stores the tone level value Lp of the manual performance as calculated at the step P3 above into the predetermined area of the manual performance level register 2*p*, i.e. the memory area allocated for the key manipulated by the user causing the detected note-on event. Then, the step P9 controls the tone producing unit 8-9 in accordance with the key manipulation before ending the processing of executing a manual performance of this timer interruption time.

On the other hand, if the step P2 judges that it is not a note-on event, i.e. negative (No), the process goes to a step P5 (FIG. 7*b*), which judges whether it is a tone level manipulating event such as by a volume control 13*b* (defining the general static tone level of the performance) or not. If the judgment at the step P5 rules affirmative (Yes), the process flow goes to a step P6 to store the tone level value CVO of the tone level manipulating event into the tone level register before going to the step P9 (FIG. 7*a*). The step P9 controls the tone producing unit 8-9 in accordance with the content of the tone level manipulating event.

In case it is not a tone volume manipulating event, the step P5 judges negative (No), and the process goes to a step P7, which judges whether it is an expression event caused by the user's control of the expression pedal (defining a general dynamic tone level of the performance) or not. If it is an expression event, the step P7 judges affirmative (Yes), the process moves forward to a step P8 to store the tone level value Ex of the expression event into the expression register. Then, the process flow goes to the step P9 (FIG. 6*a*) to control the tone producing unit 8-9 in accordance with the content of the expression event.

Further, if the detected event is a note-off event or else which is an event other than the expression event, the step P7 judges negative (No), and the process flow skips to the step P9 (FIG. 7*a*), which controls the tone producing unit 8-9 in accordance with the content of the detected event.

The flow chart of FIG. 8 describe the procedure in an example of the processing for indicating velocities of the respective keys manipulated in a manual performance and of the note events in an automatic performance data file using the multilevel indicator device 16 on an electronic musical instrument according to an embodiment of the present invention. This processing will provide a dynamic presentation of the performing conditions of the electronic musical instrument with respect to the tone levels based on the manual performance levels Lp and the automatic performance levels La respectively obtained from the processing for a manual performance (FIGS. 7*a* and 7*b*) and the processing for an automatic performance (FIGS. 6*a* and 6*b*). This processing is conducted periodically by timer interruptions, for example, at every tick of the timer so that the velocity indications will be presented about the respective manual key manipulations on a manual performance even though an automatic performance is not running.

As this processing for indicating the velocities starts, first in a step D1, the CPU 1 sets the key subject to this processing at the lowest key of the electronic musical instrument. Subsequently, a step D2 reads out the tone level of the manual performance (i.e. manual performance level Lp) and of the automatic performance (i.e. automatic performance level La) stored in the memory area corresponding to the key subject to the processing in the manual performance level register 2*p* and the automatic performance level register 2*a* in the RAM 2.

A step D3 is to control the lighting states (in green) of the multilevel indicator device 16 via the display circuit 7 based on the manual performance level Lp read out at the step D2 above. In the operational example shown in FIG. 3*a*, the indicator elements DE1-DEip in a multilevel indicator unit for the subject key, i.e. from the level 1 element up to the highest level (i.e. level ip) element which corresponds to the manual performance level Lp of the subject key are lighted in green (G) and the indicator elements DEip+1 through DEn beyond the level ip are kept extinguished. In this embodiment, the value ip for the highest on-element level to be lighted is obtained by adding a value "1" to the integer portion [Lp] of the manual performance level Lp as calculated by the formula (2) before.

A step D4 is to control the lighting state (in red) of the multilevel indicator device 16 via the display circuit 7 based on the automatic performance level La read out at the step D2 above. In this example shown in FIG. 3*a*, the indicator element DEia in the multilevel indicator unit for the subject key, i.e. the element of the level ia which corresponds to the automatic performance level La of the subject key is lighted in red (R) with priority to green (G). The value ia for the highest on-element level to be lighted is obtained by adding a value "1" to the integer portion [La] of the automatic performance level La as calculated by the formula (1) before.

As the highest on-element levels ip and ia are obtained by "[Lp]+1" and "[La]+1," respectively, the lowest level element is to be lighted every time a velocity indication is working, which is very helpful for the user to know the working state of the indicator device 16 as well as decorative with illumination effects for the user and the audience. Alternatively, the highest on-element levels ip and ia may be obtained otherwise, for example, by rounding up the decimal fraction of Lp and La to an integer, or by rounding Lp and La off to an integer, or by rounding down the decimal fraction of Lp and La to an integer, or by converting Lp and La to an integer using some non-linear function, or by calculating ip and ia from Lp and La using any other method, or by looking up some table.

After the lighting control of the indicator elements in the indicator device 16 at the step D4, a step D5 renews the manual performance level Lp and the automatic performance level La stored in the memory areas corresponding to the subject key in the manual performance level register 2*p* and the automatic performance level register 2*a*. The renewal takes place by subtracting a predetermined value as a decay amount per unit time lapse (e.g. lapse of 1 tick) from each of the manual performance level Lp and the automatic performance level La read out at the step D2 and re-storing thus obtained values into the respective memory areas. When the subtracted result becomes negative, the value "0" is re-stored.

Then, a step D6 shifts the subject key of the processing to the next higher key by incrementing the note number of the subject key by an amount of "1." Then, a step D7 judges whether the subject key is higher than the highest note key of the electronic musical instrument (or in the case where the multilevel indicator device is provided for a fractional range of the keyboard, the highest note key in such a fractional range) to check if the processing has been done for every key. If the judgment at the step D7 is negative (No), the process flow goes back to the step D2 to repeat the steps from D2 through D7 mentioned above. When the processing is over with the whole key compass of the electronic musical instrument, the judgment at the step D7 becomes affirmative (Yes), and the processing for indicating the velocities at this interruption time comes to an end.

Various Modifications

While particular preferred embodiments of the invention have been described with reference to the drawings, it should be expressly understood by those skilled in the art that the illustrated embodiments are just for preferable examples and that various modifications and substitutions may be made without departing from the spirit of the present invention so that the invention is not limited thereto, since further modifications may be made by those skilled in the art, particularly in light of the foregoing teachings. For example, the multilevel indicator device having a multilevel indicator unit consisting of twelve levels of LED indicator elements for each key as the bar-graphic indicator device of the invention, but the number of levels may not necessarily be twelve, and further the bar-graphic indicator device may be a color LCD panel on which bar-graphic indication for each corresponding key is displayed according to the computer graphic technology. Other light emitting elements may also be employed for the bar-graphic indication.

Further, although the data representing the tone levels of the channel volume and the expression control are added to the velocity values of the keys in the described embodiments, other values like note-off velocity values and polyphonic key pressure values may be reflected in the indicated velocity values.

Still further, while the manual performance level and the automatic performance level at the note-on time are stored as their initial values into the manual performance level register and the automatic performance level register and thereafter those stored performance levels are decreased gradually (at the step D5), the stored velocity levels in the manual performance level register and the automatic performance level register may be set to "0" to bring the indicated velocity levels to "0" at the note-off time point, or may be replaced by the note-off velocities.

It is therefore contemplated by the appended claims to cover any such modifications that incorporate those features of these improvements in the true spirit and scope of the invention.

What is claimed is:

1. An electronic musical instrument comprising:

a keyboard including a plurality of individual keys, arrayed in a first direction, for a manual performance where individual musical notes are manually playable;

an automatic performance device for playing an automatic performance based on input automatic performance data during the manual performance;

a detecting device for detecting respective key depression velocities of the individual keys being manually played;

an indicator device having a plurality of lightable bar-graphic indicators each for one of said individual keys in the keyboard, the bar-graphic indicators being arrayed side by side in said first direction, each of said bar-graphic indicators being elongate in a second direction which is perpendicular to said first direction; and an indicator controlling device for controlling lighting of said bar-graphic indicators respectively in accordance with the automatic performance data and said detected key depression velocities of the individual keys manually played, wherein the indicator controlling device controls lighting of the bar-graphic indicators during the manual performance so that the bar-graphic indicator associated with a manually depressed key concurrently displays both a first visual representation of a key depression velocity of the respective manually depressed key in the keyboard concurrently with the key depression and a second visual representation of a corresponding note played by the automatic performance concurrently with the respective manually depressed key, and wherein the bar-graphic indicator corresponding to a note of a manually depressed key displays a first length extending along the second direction that represents the first visual representation of the velocity of the note corresponding to the manually depressed key or a second length also extending along the second direction that represents the second visual representation of the tone level of a corresponding note played by the automatic performance, or both the first and second lengths overlappingly along the second direction if the corresponding note is concurrently played manually and by the automatic performance.

2. An electronic musical instrument as claimed in claim 1, further comprising:

a tone producing device for producing tones of the manually played musical notes; and a general tone level control device for controlling a general level of the tones of said manually played musical notes, wherein said detecting device also detects said general level as controlled by said general tone level control device, and wherein said indicator controlling device controls said bar-graphic indicators of the keys which correspond to said manually played musical notes in accordance with said detected key depression velocities and with said general level of the tones of the manually played musical notes in said first visual representation.

3. An electronic musical instrument as claimed in claim 2, further comprising:

a performance data providing device for providing the automatic performance data which contains note data representing notes of the automatic performance and velocity data representing respective tone levels of said notes of the automatic performance, wherein said indicator controlling device also controls said bar-graphic indicators of the tone levels of said notes of the automatic performance in said second visual representation which is different from said first visual representation.

4. An electronic musical instrument as claimed in claim 3, wherein each of said bar-graphic indicators contains at least two color indicators, one of the two color indicators representing said first visual representation and another of the color indicators representing said second visual representation.

5. An electronic musical instrument as claimed in claim 1, further comprising:

a tone producing device for producing tones of the manually played musical notes and tones of the notes of the automatic performance; and a general tone level control device for controlling a general level of the tones of said manually played musical notes, wherein said detecting device also detects said general level as controlled by said general tone level control device, wherein the automatic performance data further contains general performance level data for controlling a general level of the tones of said notes of the automatic performance, and wherein said indicator controlling device controls said bar-graphic indicators of the keys which correspond to the manually played musical notes in accordance with said detected key depression velocities and with said general level of the tones of the manually played musical notes in said first visual representation, and controls said bar-graphic indicators of the keys which correspond to the notes of the automatic performance in accordance with said velocity data contained in the automatic performance data and with said general performance level data contained in the automatic performance data in said second visual representation.

6. A computer readable medium storing a computer program for an electronic musical instrument comprising a computer, a keyboard including a plurality of individual keys, arrayed in a first direction, for a manual performance where individual musical notes are manually played, an automatic performance device for playing an automatic performance based on input automatic performance data during the manual performance, and an indicator device having a plurality of lightable bar-graphic indicators, each for one of said individual keys in the keyboard, the bar-graphic indicators being arrayed side by side in said first direction, each of said bar-graphic indicators being elongate in a second direction which is perpendicular to said first direction, the program containing instructions for:

detecting respective key depression velocities of said individual keys being manually played; and controlling, during the manual performance, lighting of said bar-graphic indicators respectively in accordance with the automatic performance data and said detected key depression velocities of the individual keys being manually played so that the bar-graphic indicator associated with a manually depressed key concurrently displays both a first visual representation of a key depression velocity of the respective manually depressed key in the keyboard concurrently with the key depression and a second visual representation of a corresponding note played by the automatic performance concurrently with the respective manually depressed key, and wherein the bar-graphic indicator corresponding to a note of a manually depressed key displays a first length extending along the second direction that represents the first visual representation of the velocity of the note corresponding to the manually depressed key or a second length also extending along the second direction that represents the second visual representation of the tone level of a corresponding note played by the automatic performance, or both the first and second lengths overlappingly along the second direction if the corresponding note is concurrently played manually and by the automatic performance.

* * * * *